United States Patent
Shirakata et al.

(10) Patent No.: US 8,489,253 B2
(45) Date of Patent: Jul. 16, 2013

(54) DRIVER STATE ASSESSMENT DEVICE

(75) Inventors: Tetsuro Shirakata, Wako (JP); Yoichi Sugimoto, Wako (JP); Hiroshi Tokutake, Sakai (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/394,891

(22) PCT Filed: Sep. 28, 2010

(86) PCT No.: PCT/JP2010/066775
§ 371 (c)(1),
(2), (4) Date: May 17, 2012

(87) PCT Pub. No.: WO2011/040390
PCT Pub. Date: Apr. 7, 2011

(65) Prior Publication Data
US 2012/0221171 A1 Aug. 30, 2012

(30) Foreign Application Priority Data
Sep. 30, 2009 (JP) ................................ 2009-228006

(51) Int. Cl.
| G05D 1/00 | (2006.01) |
| G05D 3/00 | (2006.01) |
| G06F 7/00 | (2006.01) |
| G06F 17/00 | (2006.01) |

(52) U.S. Cl.
USPC ............................................. 701/1; 340/576

(58) Field of Classification Search
USPC ...... 717/124; 340/576, 438; 250/330; 701/45; 382/100; 356/4.01
See application file for complete search history.

(56) References Cited

U.S. PATENT DOCUMENTS

| 7,415,126 | B2 * | 8/2008 | Breed et al. | .................... 382/100 |
| 7,831,358 | B2 * | 11/2010 | Breed et al. | ..................... 701/45 |
| 7,983,817 | B2 * | 7/2011 | Breed | ............................ 701/45 |
| 2007/0028219 | A1 * | 2/2007 | Miller et al. | ................... 717/124 |
| 2008/0036580 | A1 * | 2/2008 | Breed | ........................... 340/438 |
| 2008/0142713 | A1 * | 6/2008 | Breed et al. | ..................... 250/330 |
| 2009/0033501 | A1 * | 2/2009 | Chen et al. | ..................... 340/576 |
| 2011/0285982 | A1 * | 11/2011 | Breed | .......................... 356/4.01 |

FOREIGN PATENT DOCUMENTS

| JP | 3-186713 | 8/1991 |
| JP | 2009-018765 | 1/2009 |
| JP | 2009-073462 | 4/2009 |
| JP | 2009-157606 | 7/2009 |

* cited by examiner

*Primary Examiner* — Thomas Black
*Assistant Examiner* — Robert Payne
(74) *Attorney, Agent, or Firm* — Rankin, Hill & Clark LLP

(57) ABSTRACT

A driver state assessment device is provided in which when driver model identification means (M2) identifies a driver model showing a driver's input/output relationship using a difference between a target azimuth and an actual azimuth as a driver's input and an actual steering angle as a driver's output, driver model amount of operation acquisition means (M3) acquires a driver model steering angle by inputting a current azimuth deviation into the driver model, and driver state assessment means (M4) calculates a difference between a current actual steering angle and a driver model steering angle as a residual error and assesses the driver's state based on the residual error. Therefore, since the residual error is an index that represents a fluctuation component, a noise component, a non-linear component, etc. obtained from the driver model, it is possible to assess, with high precision, the driver's state, in particular a low wakefulness state of the driver, based on this residual error.

8 Claims, 4 Drawing Sheets

DRIVER STATE ASSESSMENT DEVICE

TECHNICAL FIELD

The present invention relates to a driver state assessment device for accurately assessing that a vehicle driver has fallen asleep at the wheel, etc.

BACKGROUND ART

FIG. 4 is a block diagram for a vehicle yaw control system in which a driver intervenes, and for example a case in which a driver controls the azimuth of a vehicle by operating a steering wheel so that the vehicle travels along a white line of a road is envisaged. The driver visually recognizes an azimuth deviation, which is a deviation between a target azimuth for making the direction of travel of the vehicle follow the direction of the white line and an actual azimuth that is actually generated in the vehicle, assesses in which direction and by how much the steering wheel is to be operated, and operates the steering wheel. As a result, a steering angle is generated in the steering wheel, the vehicle responds, and a change is generated in the azimuth. In this process, vehicle behavior is influenced by environmental factors such as the coefficient of friction of the road surface and the load of the vehicle, and an actual azimuth is finally generated.

If the driver is falling asleep at the wheel, since it becomes difficult to make the vehicle travel along the white line of the road with good precision, the azimuth deviation increases. It is therefore possible by observing the azimuth deviation to assess that the driver is in a low wakefulness state. However, this method is based on control results (white line tracking precision) from driving performance, and since a low wakefulness state is assessed based on the driving results manifested in the actual vehicle behavior, there is a possibility that a delay will occur in the assessment.

If a driver model, in which a driver is modeled, is identified and a comparison is made between the output (driver model steering angle) when an azimuth deviation is inputted thereinto and the actual driver's output (actual steering angle), a driver's low wakefulness state can be assessed without waiting for a change in the vehicle behavior, and it becomes possible to carry out assessment at an earlier stage.

As a driver state assessment device employing such a driver model, an arrangement in which evaluation of a current driver's state (falling asleep at the wheel or driving under the influence of alcohol) is carried out by identifying a driver model based on outputs from a vehicle-installed target value sensor (lane detecting camera), a movement sensor (yaw rate sensor), and an operation sensor (steering angle sensor) and comparing this driver model with a standard driver model is known from Patent Document 1 below.

Related Art Documents

Patent Documents

Patent Document 1: Japanese Patent Application Laid-open No. 2009-18765

SUMMARY OF THE INVENTION

Problems to be Solved by the Invention

In the above-mentioned conventional arrangement, since the Bode plot of an identified driver model and the Bode plot of a standard driver model are compared and a driver's state is evaluated based, for example, on whether the shape of a characteristic line of a gain plot is a peak or is flat, the assessment criteria are ambiguous, and it is unclear what kind of assessment index should be specifically used in order for the driver's state to be assessed.

The present invention has been accomplished in light of the above-mentioned circumstances, and it is an object thereof to carry out assessment with high precision at an early stage by use of an appropriate assessment index when assessing a driver's state using a driver model.

Means for Solving the Problems

In order to attain the above object, according to a first aspect of the present invention, there is provided a driver state assessment device comprising operating target value acquisition means for determining a driver's operating target value based on an output from a vehicle-installed sensor, actual amount of movement acquisition means for determining an actual amount of movement of the vehicle, actual amount of operation acquisition means for determining an actual amount of operation by the driver, driver model identification means for identifying a driver model showing a driver's input/output relationship using the difference between the operating target value and the actual amount of movement as the driver's input and the actual amount of operation as the driver's output, driver model amount of operation acquisition means for acquiring a driver model amount of operation by inputting a difference between a current operating target value and the actual amount of movement into the driver model identified by the driver model identification means, and driver state assessment means for calculating a difference between the current actual amount of operation determined by the actual amount of operation acquisition means and the driver model amount of operation determined by the driver model amount of operation acquisition means as a residual error, and assessing the driver's state based on the residual error.

Further, according to a second aspect of the present invention, in addition to the first aspect, the driver state assessment means calculates a normalized residual error from smoothed residual error/(steady state gain)$^2$, and assesses the driver's state based on the normalized residual error.

Furthermore, according to a third aspect of the present invention, in addition to the second aspect, the driver state assessment means calculates the normalized residual error based on the value of the steady state gain, for which the frequency is 10 rad/sec.

Moreover, according to a fourth aspect of the present invention, in addition to the second or third aspect, the driver state assessment means assesses that the driver is in a low wakefulness state when the normalized residual error is at least an assessment threshold value.

Further, according to a fifth aspect of the present invention, in addition any one of the first to fourth aspects, the driver model identification means identifies a driver model by a first-order differential expression.

Furthermore, according to a sixth aspect of the present invention, in addition to any one of the first to fifth aspects, the device comprises filter means for restricting the frequency range of a signal inputted into the driver model.

Moreover, according to a seventh aspect of the present invention, in addition to the sixth aspect, the filter means restricts the frequency range of the signal inputted into the driver model so as to be from 1 rad/sec to 10 rad/sec.

A video camera Sa of an embodiment corresponds to the sensor of the present invention, a yaw rate sensor Sb of the embodiment corresponds to the actual amount of movement acquisition means of the present invention, a steering angle sensor Sc of the embodiment corresponds to the actual amount of operation acquisition means of the present invention, and a band-pass filter 15 of the embodiment corresponds to the filter means of the present invention.

Effects of the Invention

In accordance with the first aspect of the present invention, when the driver model identification means identifies the driver model showing a driver's input/output relationship using the difference between the operating target value and the actual amount of movement as the driver's input and the actual amount of operation as the driver's output, the driver model amount of operation acquisition means acquires the driver model amount of operation by inputting the difference between the current operating target value and the actual amount of movement into the driver model, and the driver state assessment means calculates the difference between the current actual amount of operation and the driver model amount of operation as the residual error and assesses the driver's state based on the residual error. Since the residual error is an index that represents a fluctuation component, a noise component, a non-linear component, etc. obtained from the driver model, it is possible to assess, with high precision, the driver's state, in particular a low wakefulness state of the driver, based on this residual error.

Furthermore, in accordance with the second aspect of the present invention, since the driver state assessment means calculates the normalized residual error from smoothed residual error/(steady state gain)$^2$ and assesses the driver's state based on this normalized residual error, it becomes possible to make a comparison between different drivers, thus improving the multi-purpose features and convenience.

Moreover, in accordance with the third aspect of the present invention, since the driver state assessment means calculates the normalized residual error based on the value of the steady state gain, for which the frequency is 10 rad/sec, a normalized residual error having greater multi-purpose features and convenience can be obtained by calculation.

Furthermore, in accordance with the fourth aspect of the present invention, since the driver state assessment means assesses that the driver is in a low wakefulness state when the normalized residual error is at least the assessment threshold value, a low wakefulness state of the driver can be assessed with good precision.

Moreover, in accordance with the fifth aspect of the present invention, since the driver model identification means identifies the driver model by the first-order differential expression, the driver model becomes simple, and it becomes possible to extract only a simple driving operation. Therefore, the difference after removing the simple driving operation extracted by the driver model from the actual driving operation contains a complicated driving operation that cannot be identified by a simple driver model, and the driver's state can be accurately assessed based on this driving operation. Furthermore, when the difference after removing the simple driving operation extracted by the driver model from the actual driving operation contains hardly any complicated driving operation, since it is assumed that the driver continues a simple driving operation, the driver's driving operation can be assessed as being stable.

Furthermore, in accordance with the sixth aspect of the present invention, since it includes the filter means for restricting the frequency range of the signal inputted into the driver model, an increase in the residual error when driver's drowsiness increases can be made prominent.

Moreover, in accordance with the seventh aspect of the present invention, since the filter means restricts the frequency range of the signal inputted into the driver model so that it is from 1 rad/sec to 10 rad/sec, an increase in the driver's residual error when drowsiness increases can be made more prominent.

EXPLANATION OF REFERENCE NUMERALS AND SYMBOLS

M1 Operating target value acquisition means
M2 Driver model identification means
M3 Driver model amount of operation acquisition means
M4 Driver state assessment means
Sa Video camera (sensor)
Sb Yaw rate sensor (actual amount of movement acquisition means)
Sc Steering angle sensor (actual amount of operation acquisition means)
15 Band-pass filter (filter means)

MODE FOR CARRYING OUT THE INVENTION

A mode for carrying out the present invention is explained below by reference to FIG. 1 to FIG. 3.
Embodiment 1

Figure 1:
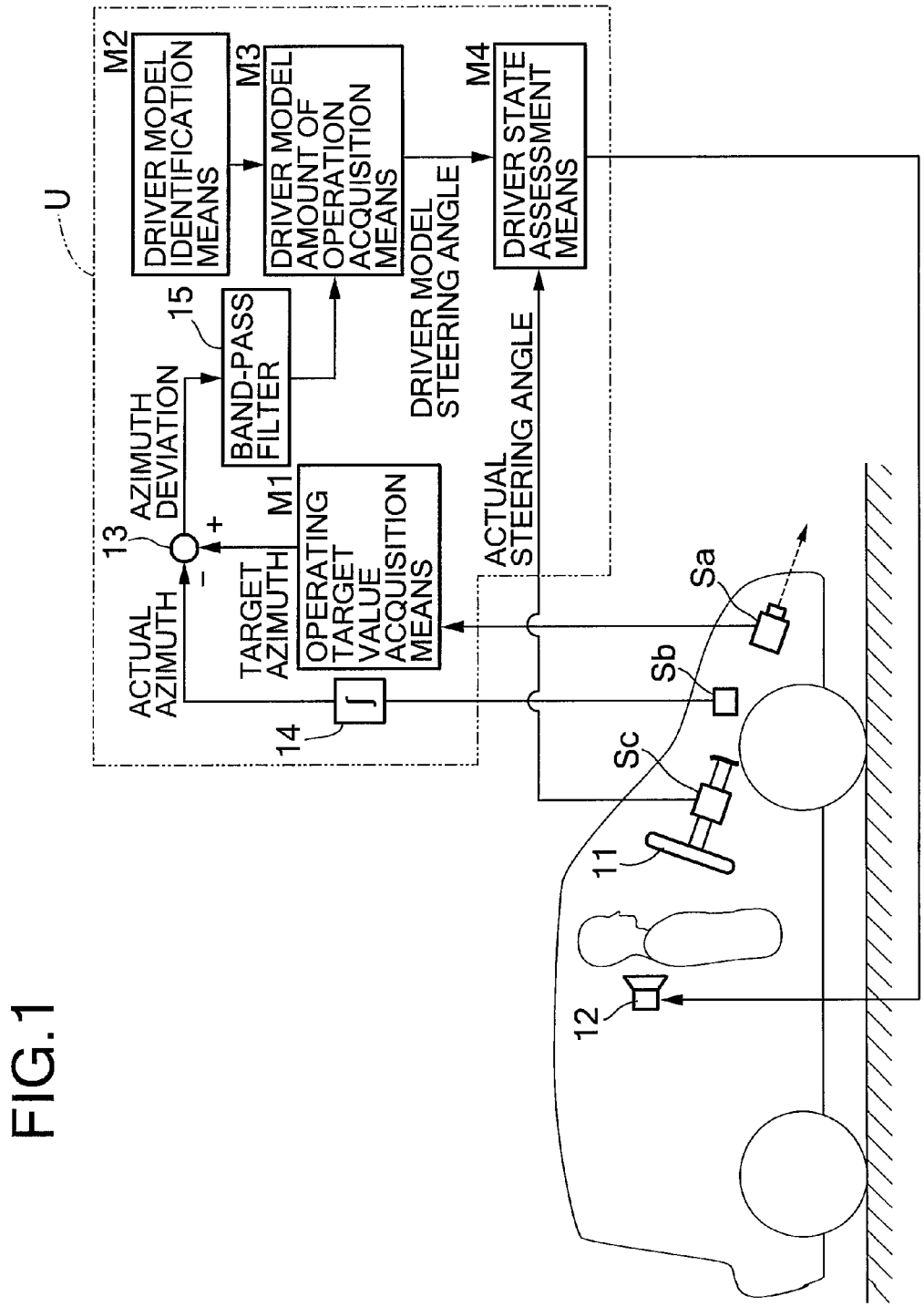
FIG. 1 is a block diagram showing the arrangement of a driver state assessment device.
Figure 2:
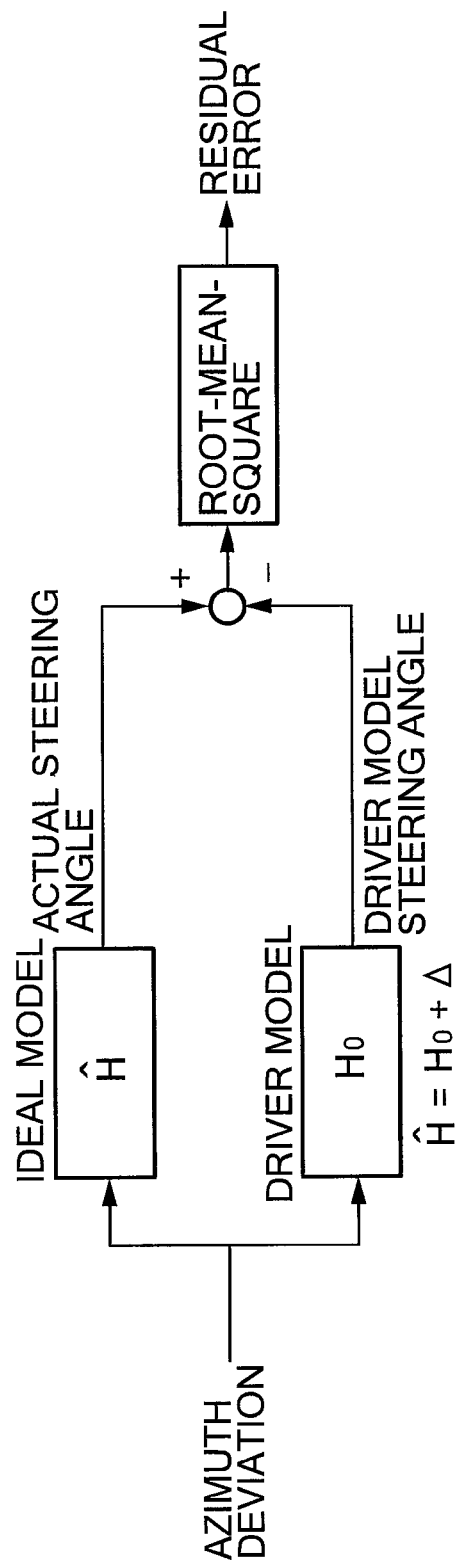
FIG. 2 is a diagram for explaining a method for calculating 'residual error'.

As shown in FIG. 1, a vehicle includes a video camera Sa that takes an image of a white line on a road, a yaw rate sensor Sb that detects the vehicle's actual azimuth, and a steering angle sensor Sc that detects a steering angle of a steering wheel 11 operated by a driver, and an electronic control unit U into which signals from the video camera Sa, the yaw rate sensor Sb, and the steering angle sensor Sc are inputted wakens the driver by making a speaker 12 generate an alarm sound when it assesses that the driver is in a low wakefulness state, that is, falling asleep at the wheel. The electronic control unit U includes operating target value acquisition means M1, driver model identification means M2, driver model amount of operation acquisition means M3, and driver state assessment means M4.

The operating target value acquisition means M1 of the electronic control unit U processes the image of the white line of the road taken by the video camera Sa, and calculates a target azimuth as an operating target value from a deviation between the direction of the white line and the direction of the vehicle body fore-and-aft axis. The larger the deviation between the direction of the white line and the direction of the vehicle body fore-and-aft axis, the larger is the target azimuth to be set, and the sign thereof is set according to the direction of the deviation of the vehicle body fore-and-aft axis relative to the direction of the white line. Furthermore, the operating target value acquisition means M1 may determine the target azimuth by smoothing the integral value of the actual azimuth detected by the yaw rate sensor Sb.

The target azimuth calculated by the operating target value acquisition means M1 corresponds to the operating target value of the present invention, an actual azimuth calculated by an integrator 14 integrating the actual yaw rate detected by the yaw rate sensor Sb corresponds to the actual amount of movement of the present invention, and the actual steering angle of the steering wheel 11 detected by the steering angle sensor Sc corresponds to the actual amount of operation of the present invention.

In the driver model identification means M2 of the electronic control unit U, a driver model is identified in advance in which the value of the azimuth deviation, which is the deviation obtained by subtracting the actual azimuth from the target azimuth, is an input, the value having passed a band-pass filter 15 with a frequency range of 1 to 10 rad/sec, and the actual steering angle is an output. Since variation of the driver model due to increase in drowsiness appears in a high frequency bandwidth, it becomes possible by passage through the band-pass filter 15 having a filter bandwidth in the above-mentioned range to make an increase in residual error when drowsiness increases more prominent.

In the present embodiment, the driver model defining the relationship between the azimuth deviation, which is the input, and the actual steering angle, which is the output, is given in the simple first-order differential expression below.

$$K/(1+Ts)$$

K: gain coefficient
T: time response

Since there is the relationship: [amount of operation (actual steering angle)]=[K/(1+Ts)]×[vehicle movement (azimuth deviation)], the first-order differential expression [K/(1+Ts)], which is the driver model, is given from $$[K/(1+Ts)]=[\text{amount of operation (actual steering angle)}]/[\text{vehicle movement (azimuth deviation)}].$$

Here, the [amount of operation (actual steering angle)] on the right-hand side is the actual steering angle outputted by the steering angle sensor Sc, the [vehicle movement (azimuth deviation)] on the right-hand side can be calculated from the target azimuth outputted by the operating target value acquisition means M1 and the actual azimuth calculated from the output of the yaw rate sensor Sb, all can be measured, and it is therefore possible to identify the driver model.

With regard to the driver model, one identified based on normal characteristics (during wakefulness) of a standard driver may be shared by a plurality of drivers, or one identified based on normal characteristics (during wakefulness) of an individual driver may be exclusively used by the driver.

Subsequently, in the driver model amount of operation acquisition means M3, a driver model amount of operation is calculated by applying a value, that has passed through the band-pass filter 15 having a frequency range of 1 to 10 rad/sec, of the azimuth deviation outputted by subtraction means 13, to the driver model identified in advance in the driver model identification means M2.

That is, in $$[\text{amount of operation (actual steering angle)}]=[K/(1+Ts)]\times[\text{vehicle movement (azimuth deviation)}],$$

since [K/(1+Ts)] on the right-hand side is identified in advance by the driver model identification means M2, assigning the value, that has been passed through the band-pass filter 15 having a frequency range of 1 to 10 rad/sec, of the azimuth deviation outputted by the subtraction means 13 to [vehicle movement (azimuth deviation)] on the right-hand side allows a value corresponding to [amount of operation (actual steering angle)] on the left-hand side, that is, a driver model steering angle, which is the driver model amount of operation, to be calculated.

Subsequently, the driver state assessment means M4 calculates a 'residual error' from the driver model steering angle outputted by the driver model amount of operation acquisition means M3 and the actual steering angle outputted by the steering angle sensor Sc, and assesses the driver's low wakefulness state using this 'residual error' as an index.

This is explained by reference to FIG. 2; when the azimuth deviation outputted by the subtraction means 13 is inputted into the actual driver (ideal model) and the driver model, the ideal model outputs an actual steering angle, and the driver model outputs a driver model steering angle. 'Residual error' is calculated as the root-mean-square of the difference obtained by subtracting the driver model steering angle from the actual steering angle. That is, since (actual driver's input/output)=(ideal model's input/output), the difference between the actual steering angle, which is the actual driver's output, and the driver model steering angle, which is the output obtained by inputting the azimuth deviation into the driver model, is calculated, and the root-mean-square of the difference is defined as the 'residual error'.

In this way, the 'residual error' is the root-mean-square of the difference between the actual steering angle and the driver model steering angle, represents a fluctuation component from the driver model, a noise component contained in the driver model, a non-linear component, etc., and is an index representing the stability of a driving operation or a complicated driving operation. It is therefore possible to assess a driver's low wakefulness state based on this 'residual error'.

In addition, since the above-mentioned 'residual error' cannot be compared between different drivers, a 'normalized residual error' obtained by normalizing, using a steady state gain (gain when frequency ω=10 rad/sec in the gain plot), a 'smoothed residual error' obtained by smoothing the 'residual error' by means such as taking a moving average is used, thus enabling a comparison to be made between different drivers and enhancing the multi-purpose feature and convenience.

Normalized residual error=smoothed residual error/(steady state gain)$^2$

Figure 3:
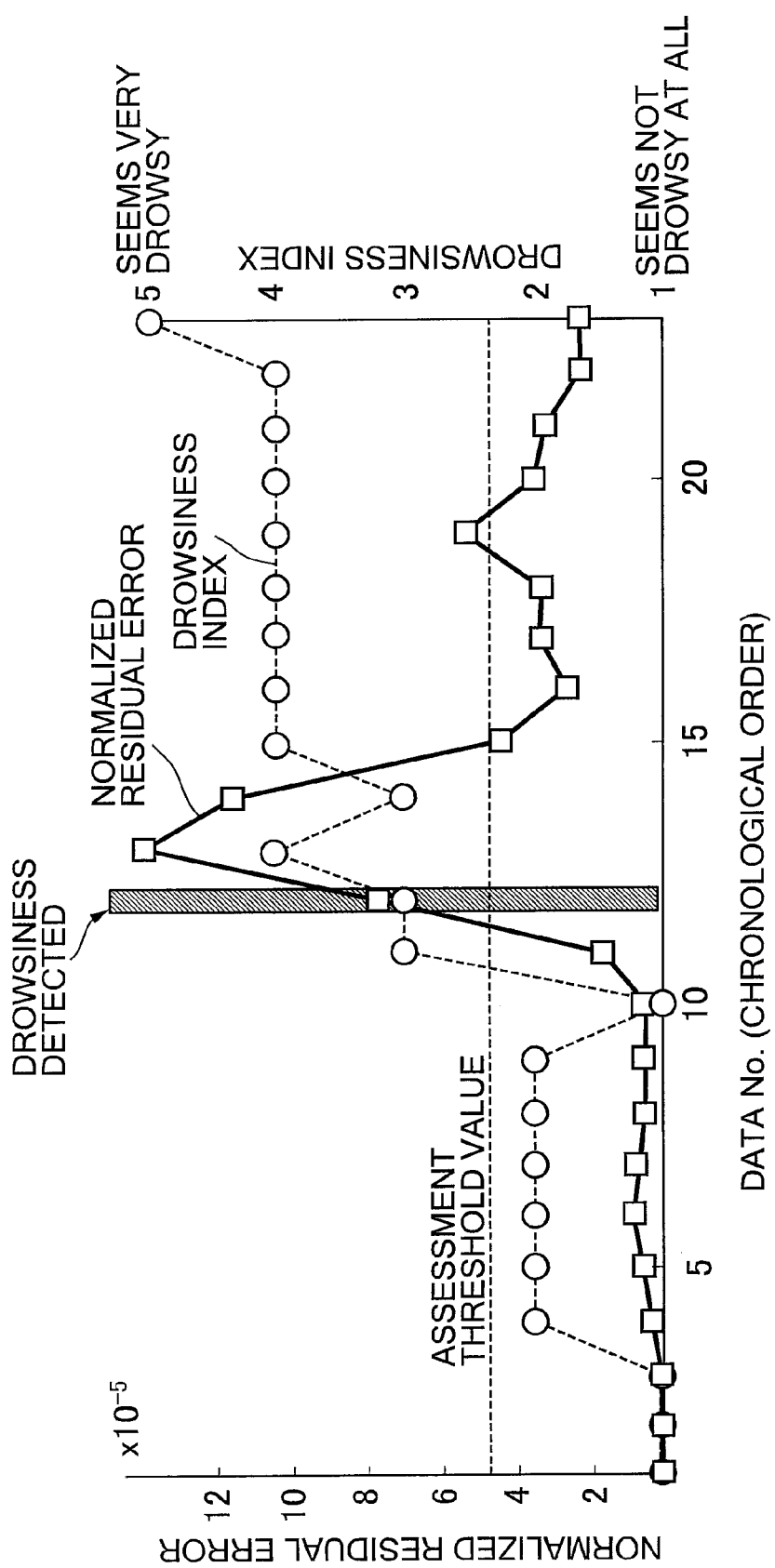
FIG. 3 is a diagram showing change in 'normalized residual error' and drowsiness index.
Figure 4:
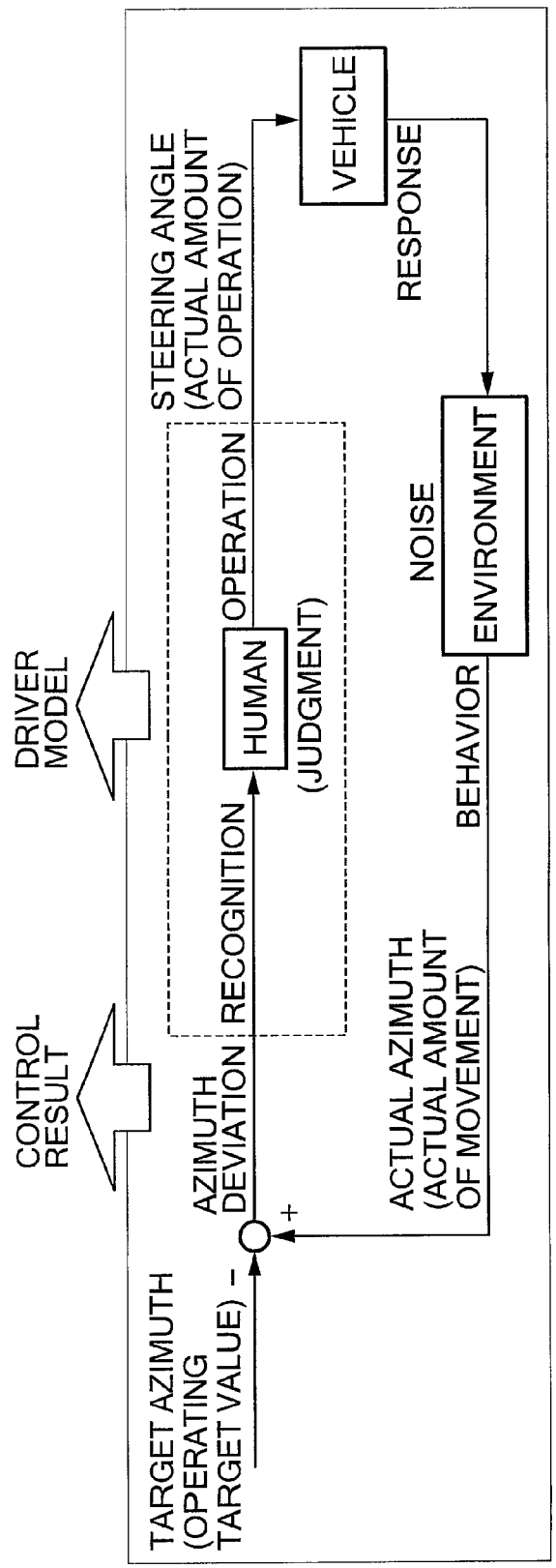
FIG. 4 is a block diagram for a vehicle yaw control system in which a driver intervenes.

FIG. 3 shows, in chronological order, a drowsiness index and a 'normalized residual error' obtained while the vehicle is run on a straight road at a speed of 60 km/h. The drowsiness index is assessed by an observer examining a driver's expression, and is divided into five levels, that is, 1: 'seems not drowsy at all', 2: 'seems slightly drowsy', 3: 'seems drowsy', 4: 'seems considerably drowsy', and 5 'seems very drowsy'.

As is clear from this figure, it is confirmed that a change in the 'normalized residual error' follows changes in the drowsiness index well, and when the 'smoothed residual error' reaches a preset assessment threshold value or greater a driver's low wakefulness state can be detected with high precision.

In addition, with regard to the steady state gain used in the 'normalized residual error', when the frequency range of the input into the driver model is from 1 rad/sec to 10 rad/sec, a driver's low wakefulness state can be assessed with the best precision. FIG. 3 shows the result when a steady state gain with 10 rad/sec in the Bode plot is used.

In this way, when the driver state assessment means M4 assesses that the driver has fallen into a low wakefulness state, the speaker 12 shown in FIG. 1 is operated, and the driver can be wakened by means of a sound, etc.

As hereinbefore described, since the driver state assessment means M4 calculates the difference between the current actual steering angle and the driver model steering angle as a 'residual error', which is an index that represents a fluctuation component, a noise component, a non-linear component, etc. obtained from the driver model, and assesses a driver's low wakefulness state based on the 'residual error', it is possible to assess a driver's low wakefulness state with high precision.

In particular, since the driver model identification means M2 identifies a driver model by a simple first-order differential expression, it becomes possible to extract only a simple driving operation therefrom. Therefore, the 'residual error' after removing a simple driving operation extracted by the driver model from the actual driving operation contains a complicated driving operation that cannot be identified by a simple driver model, and the driver's state can be accurately assessed based on this driving operation. Furthermore, when the 'residual error' after removing the simple driving operation extracted by the driver model from the actual driving operation contains hardly any complicated driving operation, since it is assumed that the driver continues a simple driving operation, it can be assessed that the driver's driving operation is stable.

An embodiment of the present invention is explained above, but the present invention may be modified in a variety of ways as long as the modifications do not depart from the spirit and scope thereof.

For example, in the embodiment the azimuth deviation is used as an input for the driver model, but lateral displacement relative to the lateral direction of the white line may be used.

The invention claimed is:

1. A driver state assessment device comprising
operating target value acquisition device for determining a driver's operating target value based on an output from a vehicle-installed sensor,
actual amount of movement acquisition device for determining an actual amount of movement of the vehicle,
actual amount of operation acquisition device for determining an actual amount of operation by the driver,
driver model identification device for identifying a driver model showing a driver's input/output relationship using a difference between the operating target value and the actual amount of movement as the driver's input and the actual amount of operation as the driver's output,
driver model amount of operation acquisition device for acquiring a driver model amount of operation by inputting a difference between a current operating target value and the actual amount of movement into the driver model identified by the driver model identification device, and
driver state assessment device for calculating a difference between the current actual amount of operation determined by the actual amount of operation acquisition device and the driver model amount of operation determined by the driver model amount of operation acquisition device as a residual error, and assessing the driver's state based on the residual error.

2. The driver state assessment device according to claim 1, wherein the driver state assessment device calculates a normalized residual error from smoothed residual error/(steady state gain)$^2$, and assesses the driver's state based on the normalized residual error.

3. The driver state assessment device according to claim 2, wherein the driver state assessment device calculates the normalized residual error based on the value of the steady state gain, for which the frequency is 10 rad/sec.

4. The driver state assessment device according to claim 2, wherein the driver state assessment device assesses that the driver is in a low wakefulness state when the normalized residual error is at least an assessment threshold value.

5. The driver state assessment device according to claim 1, wherein the driver model identification device identifies a driver model by a first-order differential expression.

6. The driver state assessment device according to claim 1, wherein the device comprises a filter device for restricting the frequency range of a signal inputted into the driver model.

7. The driver state assessment device according to claim 6, wherein the filter device restricts the frequency range of the signal inputted into the driver model so as to be from 1 rad/sec to 10 rad/sec.

8. The driver state assessment device according to claim 3, wherein the driver state assessment device assesses that the driver is in a low wakefulness state when the normalized residual error is at least an assessment threshold value.

* * * * *